(12) United States Patent
Galbiati et al.

(10) Patent No.: US 12,080,327 B2
(45) Date of Patent: Sep. 3, 2024

(54) METHOD OF OPERATING HARD DISK DRIVES AND CORRESPONDING CONTROL CIRCUIT

(71) Applicant: STMicroelectronics S.r.l., Agrate Brianza (IT)

(72) Inventors: Ezio Galbiati, Agnadello (IT); Michele Boscolo Berto, Milan (IT); Giuseppe Maiocchi, Villa Guardia (IT); Maurizio Ricci, Villa di Serio (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 18/354,797

(22) Filed: Jul. 19, 2023

(65) Prior Publication Data

US 2024/0038263 A1 Feb. 1, 2024

(30) Foreign Application Priority Data

Aug. 1, 2022 (IT) .................. 102022000016305

(51) Int. Cl.
*G11B 5/54* (2006.01)
*H02P 7/025* (2016.01)

(52) U.S. Cl.
CPC ............... *G11B 5/54* (2013.01); *H02P 7/025* (2016.02)

(58) Field of Classification Search
None
See application file for complete search history.

(56) References Cited

U.S. PATENT DOCUMENTS

| | | | | |
|---|---|---|---|---|
| 6,064,539 | A * | 5/2000 | Null ........................ | G11B 5/54 |
| 6,914,740 | B1 * | 7/2005 | Tu ......................... | G11B 5/5534 |
| 6,954,324 | B1 * | 10/2005 | Tu ......................... | G11B 19/28 |
| | | | | 360/73.03 |
| 6,970,319 | B1 * | 11/2005 | Bennett .................... | G11B 5/54 |
| 7,072,135 | B2 * | 7/2006 | Suzuki .................. | G11B 19/047 |
| 7,636,220 | B1 | 12/2009 | Chui et al. | |
| 8,693,132 | B1 | 4/2014 | Koay et al. | |
| 9,240,742 | B1 * | 1/2016 | Erickson ................ | G11B 21/12 |
| 2002/0021513 | A1 * | 2/2002 | Kaneko .................. | G11B 21/12 |
| 2002/0141101 | A1 * | 10/2002 | Brittner .................. | G11B 21/12 |
| 2002/0141102 | A1 * | 10/2002 | Kusumoto ............... | G11B 5/54 |
| 2004/0100720 | A1 | 5/2004 | Swize | |
| 2006/0066981 | A1 * | 3/2006 | Brenden .................. | G11B 5/54 |
| 2010/0246051 | A1 * | 9/2010 | Galbiati ............ | G11B 19/2063 |

* cited by examiner

*Primary Examiner* — William J Klimowicz
(74) *Attorney, Agent, or Firm* — Slater Matsil, LLP

(57) ABSTRACT

An embodiment method includes rectifying a back electromotive force of a spindle motor in a hard disk drive and energizing a voice coil motor in the hard disk drive using the rectified back electromotive force of the spindle motor via a voice coil motor power stage to retract a head of the hard disk drive to a park position. The head is retracted by moving the head towards the park position during a first retract phase and retaining the head in the park position during a second retract phase by applying a bias voltage to the voice coil motor power stage during a bias interval of the second retract phase. The method also includes producing a saturation signal indicative of onset of saturation in the voice coil motor power stage and controlling the bias voltage during the second retract phase.

20 Claims, 12 Drawing Sheets

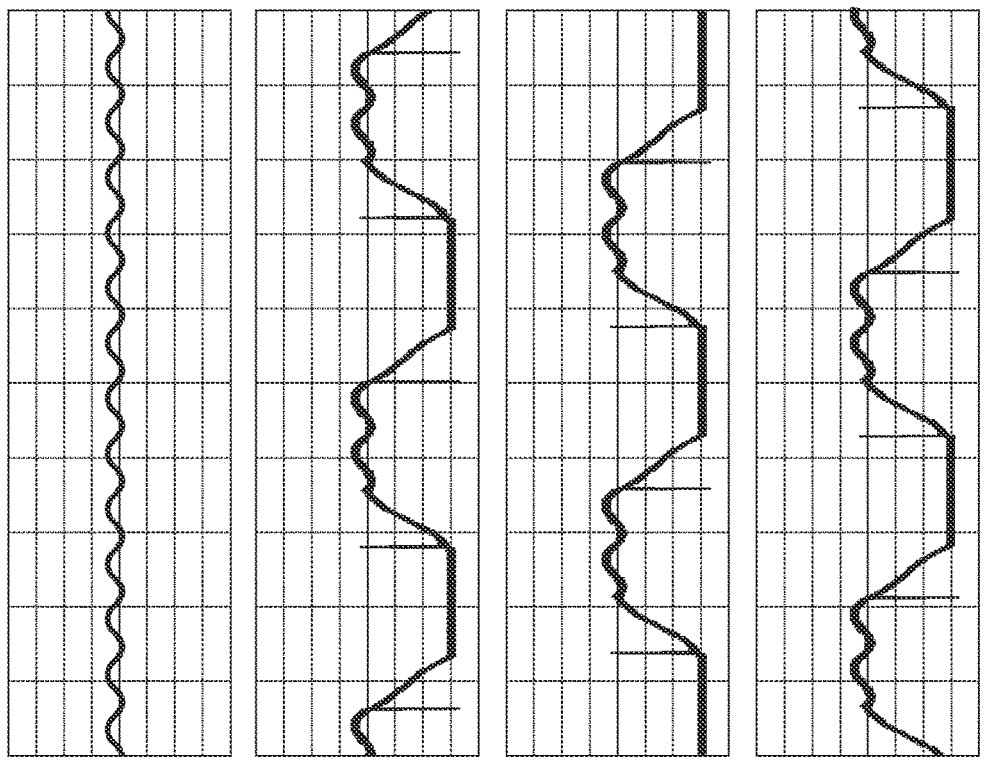
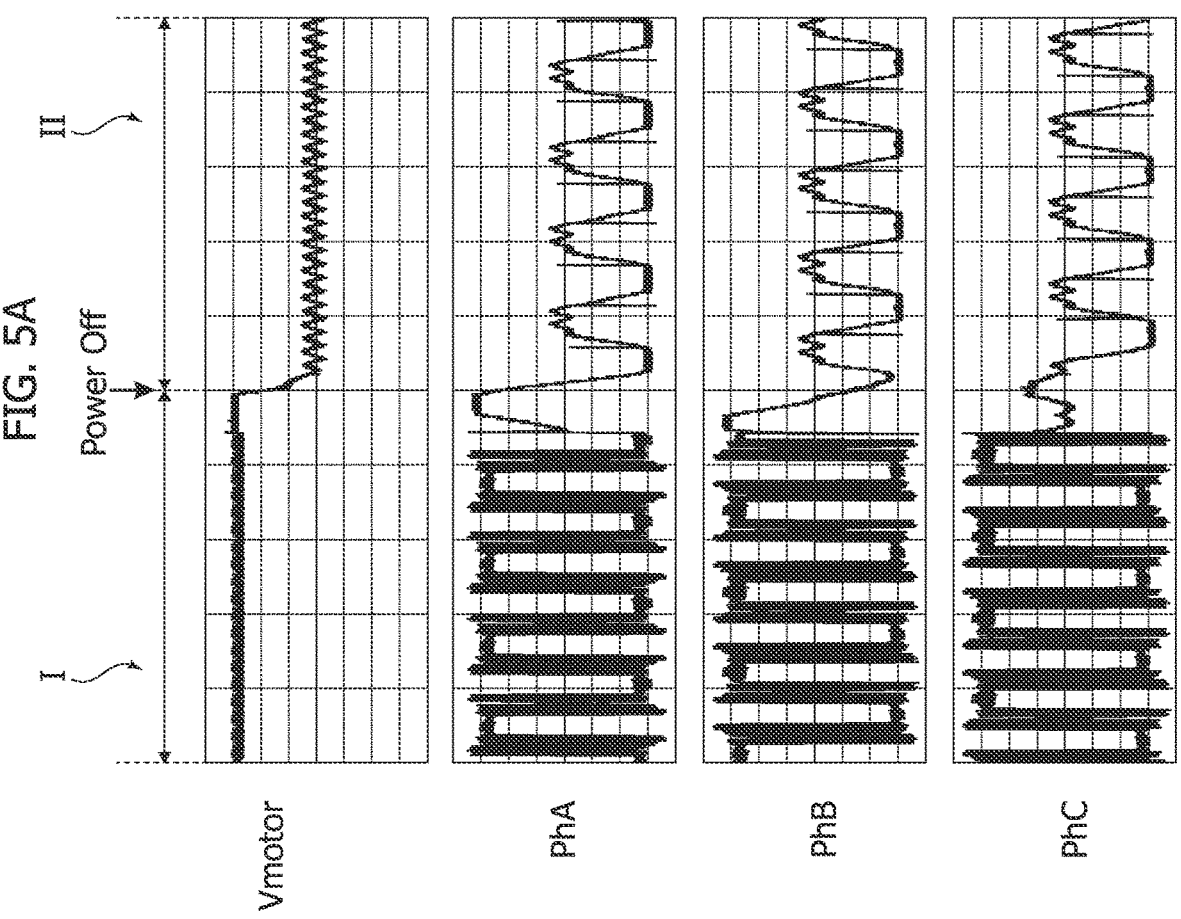

FIG. 6A
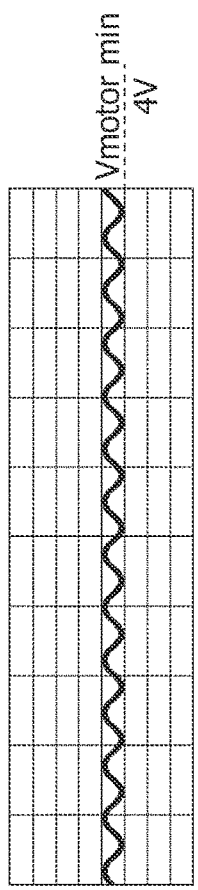
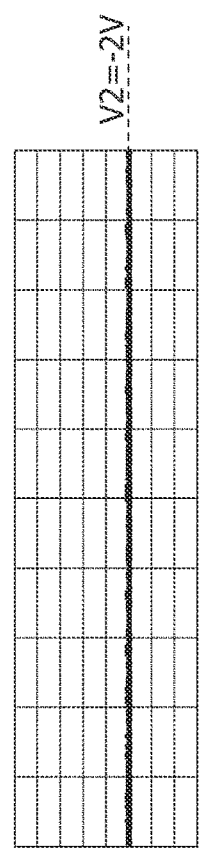
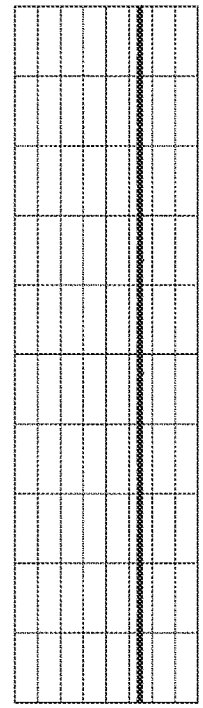
FIG. 6B
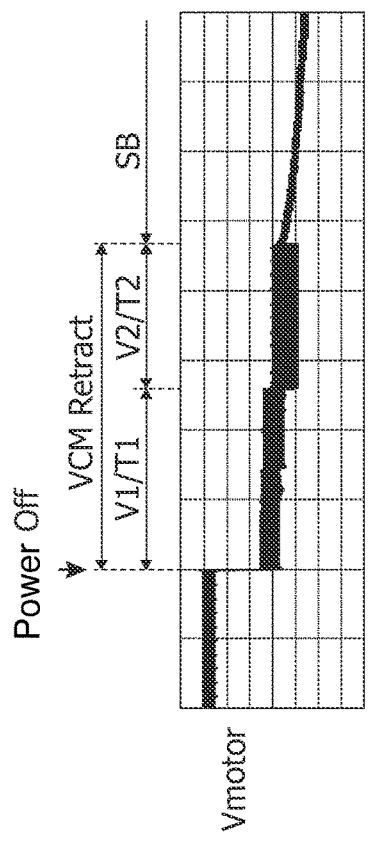
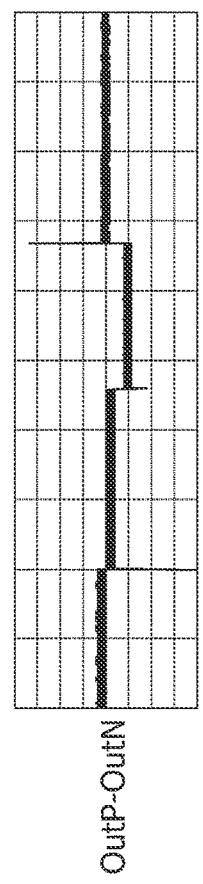
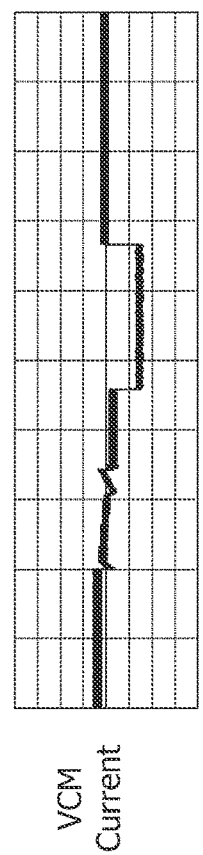

FIG. 7A
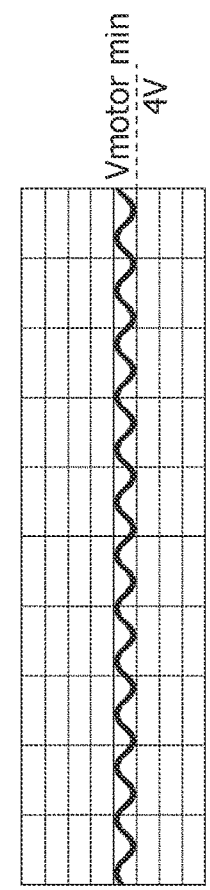
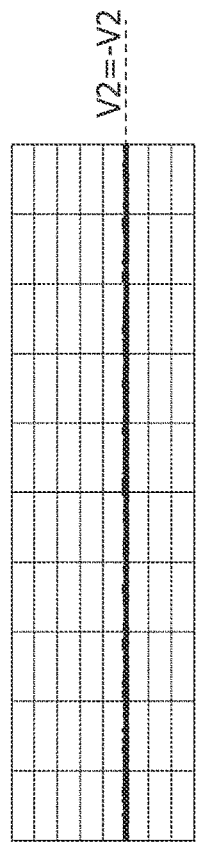
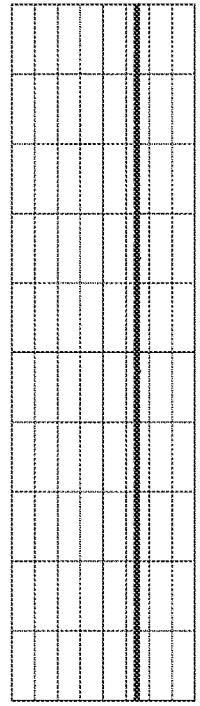
FIG. 7B
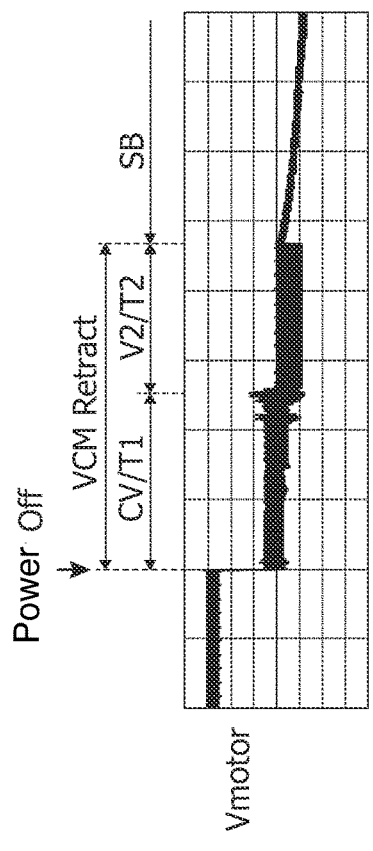
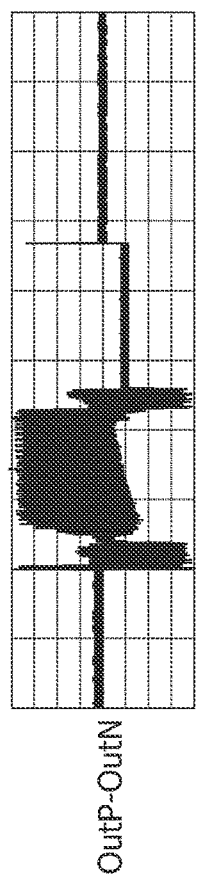
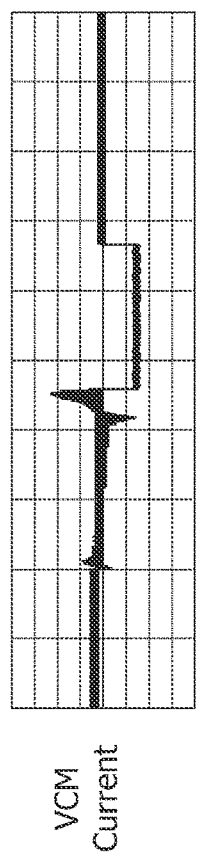

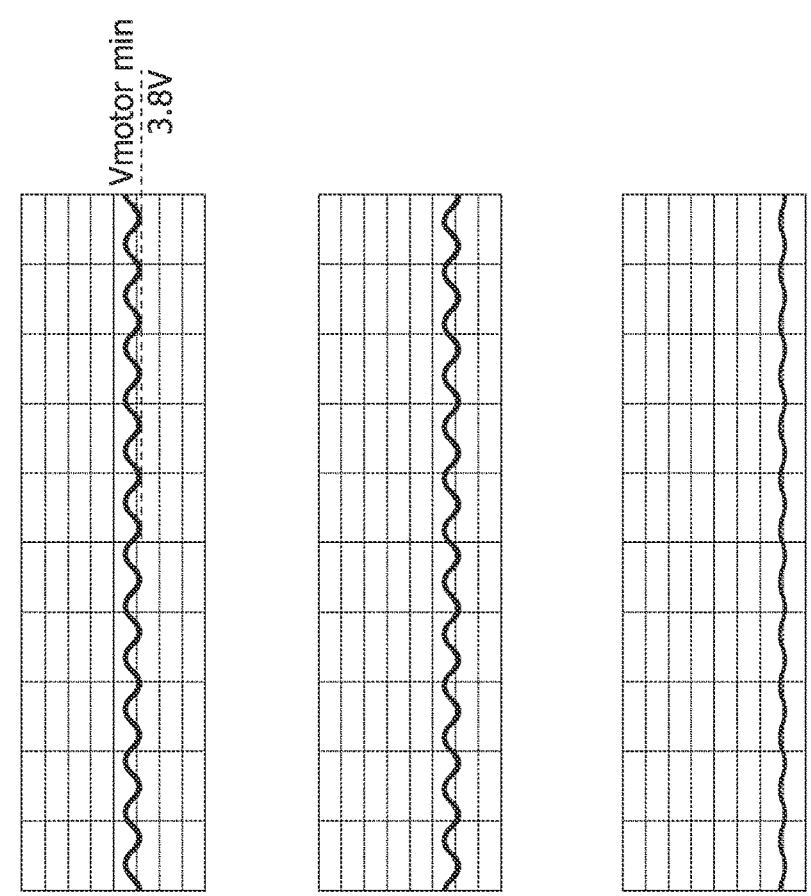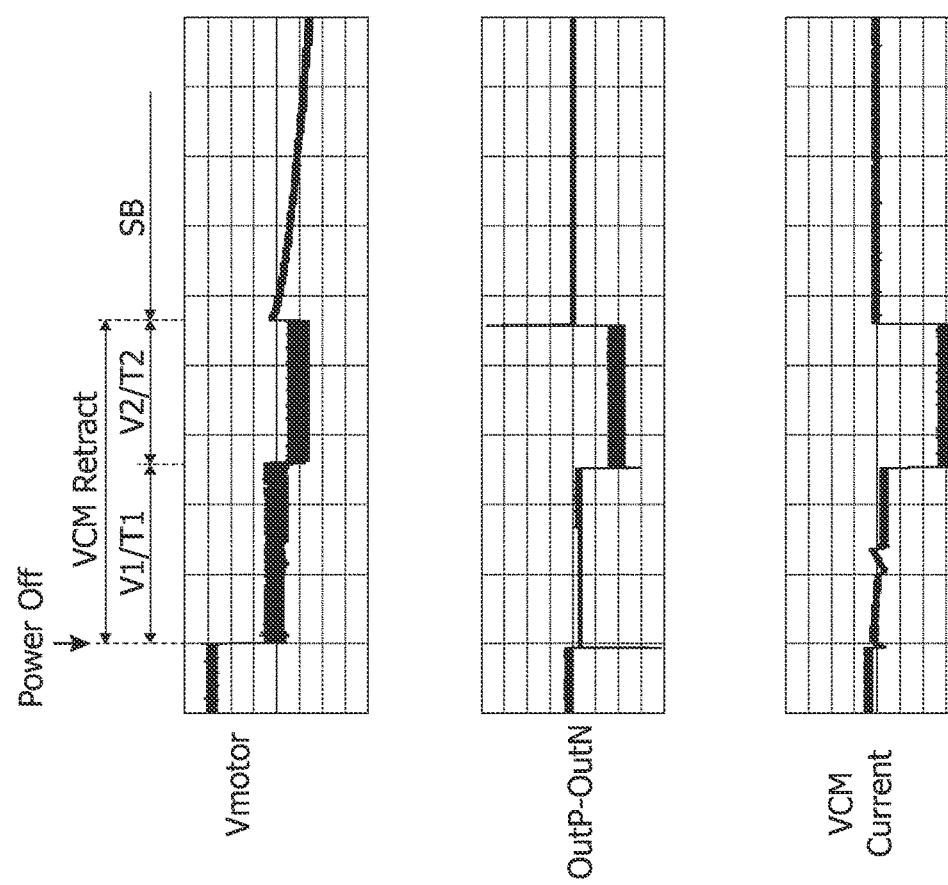

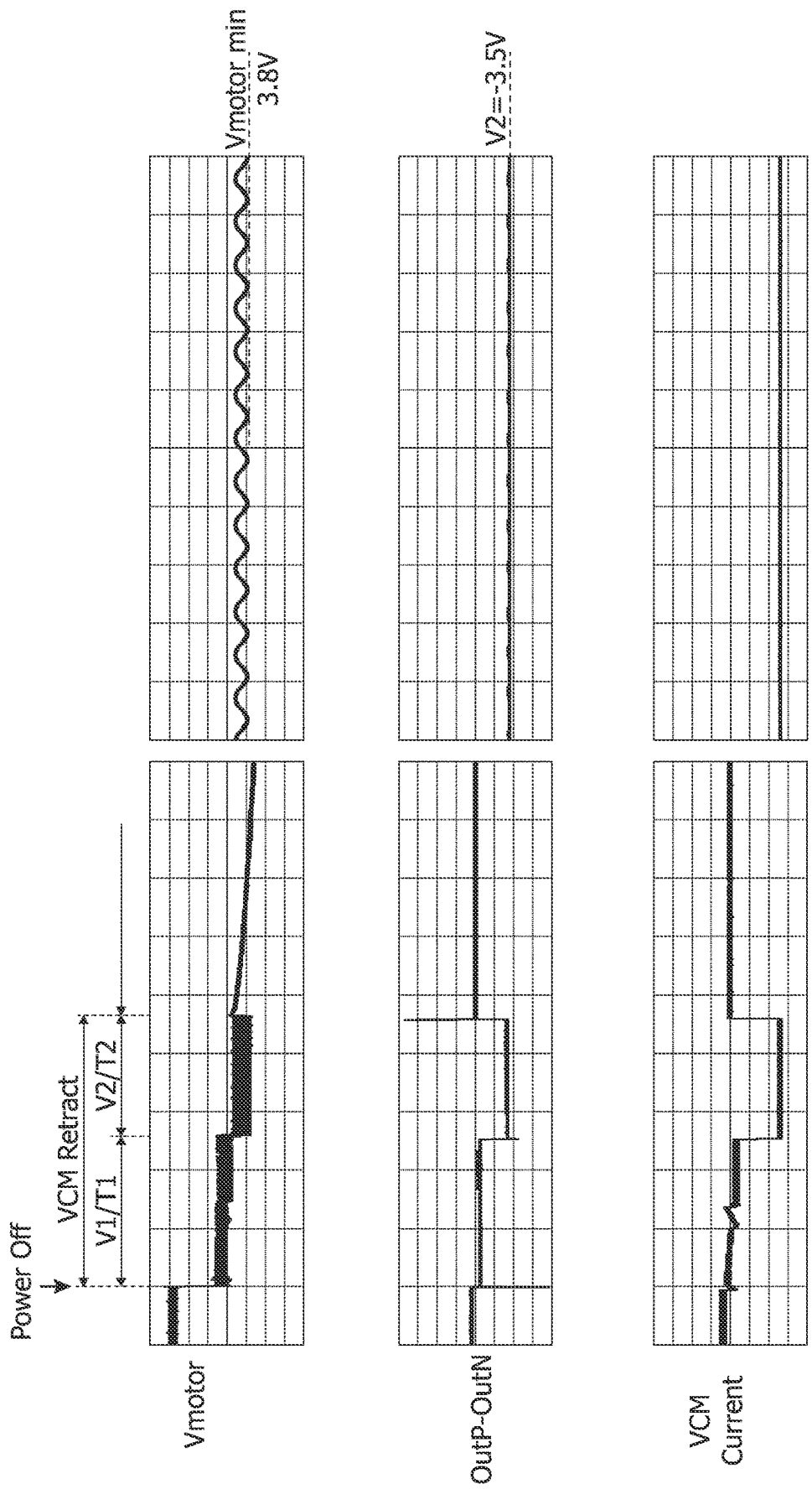

METHOD OF OPERATING HARD DISK DRIVES AND CORRESPONDING CONTROL CIRCUIT

CROSS-REFERENCE TO RELATED APPLICATIONS

This application claims priority to Italian Patent Application No. 102022000016305, filed on Aug. 1, 2022, which application is hereby incorporated herein by reference.

TECHNICAL FIELD

Embodiments and implementations relate to hard disk drives.

BACKGROUND

The designation voice coil motor or VCM is currently used to designate linear motors that move the heads in hard disk drives (HDDs).

Improving the parking procedure of the heads of an HDD (for example, in order to minimize possible acoustic noise generation that could lead to operation problems) is a goal steadily pursued in devising new HDD solutions.

In some devices, two programmable voltages (e.g., V1 and V2) are produced, each with an associated time duration (e.g., T1 and T2).

During the time T1, the voltage V1 is used to move the heads from the disks to the top of the ramp (parking position) and the voltage V2, higher than V1, is used during the time T2 to hold the heads in a stop position avoiding undesired bouncing back of the heads.

When the voltage of the spindle motor (namely Vmotor) is lower than V2, the VCM power stage is in full saturation. Under these circumstances, the voltage Vmotor is fully applied to the VCM and the voltage ripple present on the Vmotor produces a variable VCM current generating undesirable acoustic noise, e.g., over the whole time T2.

The same issue may arise in arrangements where the heads are moved from the disks to the top of the ramp (parking position) at a constant speed or velocity and a (bias) voltage V2 is again used during a time T2 to hold the heads in a stop position avoiding undesired bouncing back of the heads.

SUMMARY

Embodiments relate to hard disk drives (HDDs). One or more embodiments may be applied, for example, to hard disk drives used in processing devices such as computers, servers, data centers, and the like.

An embodiment may contribute in addressing the issue outlined in the foregoing.

One or more embodiments relate to a control circuit. One or more embodiments relate to a hard disk drive. One or more embodiments relate to a processing device. A computer, a server, or data center equipped with a hard disk drive are exemplary of such a device.

In an embodiment, a VCM power stage may be driven in an emergency head retract procedure for avoiding a condition in which the power stage is driven in full saturation, independently of the value programmed for the voltage V2.

In an embodiment, an automatic adjustment of the highest value for the voltage V2 may be performed in response to saturation being reached.

In an embodiment, the amplitude of the voltage V2 may be set manually. This approach may not be advantageous in some situations because a large margin may be allowed for by the user, with a loss in driving voltage.

In an embodiment, a bias voltage control may be performed at the end of a hard disk head parking procedure. For example, a check may be made as to whether the voltage applied to the VCM motor is equal to a programmed value (e.g., V2) only if the voltage Vmotor is lower than V2.

The system of an embodiment may thus self-adjust the value of V2 based on the voltage Vmotor so that the power stage is not brought into full saturation, because full saturation may generate a current in the VCM motor exhibiting ripples likely to generate acoustic noise.

In an embodiment, a control circuit is provided for a voice coil motor in a hard disk drive having a spindle motor. The control circuit may be configured to rectify a back electromotive force of a spindle motor in a hard disk drive. The control circuit may be configured to energize a voice coil motor in the hard disk drive using the rectified back electromotive force of the spindle motor via a voice coil motor power stage to retract a head of the hard disk drive to a park position. The retracting of the head may include moving the head towards the park position during a first retract phase, and retaining the head in the park position during a second retract phase by applying a bias voltage to the voice coil motor power stage during a bias interval of the second retract phase. The control circuit may be configured to produce a saturation signal indicative of onset of saturation in the voice coil motor power stage. And, the control circuit may be configured to control the bias voltage during the second retract phase based on the saturation signal to counter saturation in the voice coil motor power stage.

In an embodiment, the control circuit may include a bias setting node configured to receive a set value for the bias voltage, and the control circuit may be configured to reduce the value set for the bias voltage in response to the saturation signal indicating onset of saturation in the voice coil motor power stage.

In an embodiment, the control circuit may be configured to rectify the back electromotive force of the spindle motor to a rectified value. The control circuit may be configured to check if the rectified value is lower than the value set for the bias voltage. And, the control circuit may be configured to adjust the value set for the bias voltage based on the rectified value in response to the rectified voltage being found to be lower than the bias voltage.

In an embodiment, the first retract phase may include applying a constant voltage to the voice coil motor power stage to move the head of the hard disk drive towards the park position.

In an embodiment, the first retract phase may include moving the head of the hard disk drive towards the park position with a constant velocity.

In an embodiment, a control circuit is provided for a voice coil motor in a hard disk drive having a spindle motor, and the control circuit includes a regulator, a capacitor, and a voice coil motor power stage. The regulator may be coupled to windings of the spindle motor, such that the regulator is configured to rectify a spindle current of a back electromotive force of the spindle motor. The capacitor may be coupled between an output of the regulator and a reference node, and the output of the regulator may be configured to carry the rectified spindle current. The voice coil motor power stage may be coupled between to the output of the regulator and a reference node, such that the voice coil motor power stage is configured to drive the voice coil motor using the rectified back electromotive force of the spindle motor to retract a head of the hard disk drive to a park position. The retracting of the head may include moving the head towards the park position during a first retract phase, and retaining the head in the park position during a second retract phase by applying a bias voltage to the voice coil motor power stage during a bias interval of the second retract phase. The voice coil motor power stage may be configured to produce a saturation signal indicative of onset of saturation in the voice coil motor power stage. The voice coil motor power stage may be configured to control the bias voltage during the second retract phase based on the saturation signal to counter saturation in the voice coil motor power stage.

In an embodiment, the voice coil motor power stage includes a back electromotive force amplifier, a differential amplifier arrangement, a pulse-width-modulation generator, and a sample and hold circuit. The differential amplifier arrangement may be configured to provide two outputs of the differential amplifier arrangement to inputs of the back electromotive force amplifier. The pulse-width-modulation generator may be coupled to the differential amplifier arrangement such that the pulse-width-modulation generator is configured to apply a pulse-width-modulation signal to gain stages of the differential amplifier arrangement. The sample and hold circuit may be coupled to the differential amplifier arrangement and the pulse-width-modulation generator, such that the pulse-width-modulation generator is configured to control the sample and hold circuit, and such that an output of the back electromotive force amplifier is configured to apply voltage to a summing node via the sample and hold circuit in response to the control of the sample and hold circuit by the pulse-width-modulation generator.

BRIEF DESCRIPTION OF THE DRAWINGS

One or more embodiments will now be described, by way of example only, with reference to the annexed figures, wherein:

FIG. 5A is a timing diagram for embodiment, which is exemplary of synchronous rectification of the BEMF of a spindle motor in an HDD;

FIG. 5B is a zoomed reproduction of a portion of the curves of the diagram of FIG. 5A;

FIG. 6A is a time diagram for an embodiment, showing example time behaviors of various signals in response to activation of a constant voltage parking procedure, e.g., due to lack of power supply;

FIG. 6B is a zoomed reproduction of a portion of the curves of the diagram of FIG. 6A;

FIG. 7A is a time diagram of an embodiment, showing example time behaviors of various signals in response to activation of a constant velocity parking procedure, e.g., due to lack of power supply;

FIG. 7B is a zoomed reproduction of a portion of the curves of the diagram of FIG. 7A;

FIG. 8A is a time diagram of an embodiment, showing example time behaviors of various signals in response to activation of a constant voltage parking procedure, with a different programming of operating parameters with respect to FIGS. 6A and 6B;

FIG. 8B is a zoomed reproduction of a portion of the curves of the diagram of FIG. 8A;

FIG. 13A is a time diagram showing example time behaviors of various signals in constant voltage embodiments of the present description;

FIG. 13B is a zoomed reproduction of a portion of the curves of the diagram of FIG. 13A;

Corresponding numerals and symbols in the different figures generally refer to corresponding parts unless otherwise indicated.

The figures are drawn to clearly illustrate the relevant aspects of the embodiments and are not necessarily drawn to scale.

The edges of features drawn in the figures do not necessarily indicate the termination of the extent of the feature.

Also, for the sake of simplicity and ease of explanation, a same designation may be applied throughout this description to designate a circuit node or line (e.g., Vmotor) as well as a signal occurring at that node or line.

DETAILED DESCRIPTION OF ILLUSTRATIVE EMBODIMENTS

In the ensuing description, various specific details are illustrated in order to provide an in-depth understanding of various examples of embodiments according to the description. The embodiments may be obtained without one or more of the specific details, or with other methods, components, materials, etc. In some cases, known structures, materials, or operations are not illustrated or described in detail so that various embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment," "in one embodiment," or the like, that may be present in various points of the present description do not necessarily refer exactly to one and the same embodiment. Furthermore, particular configurations, structures, or characteristics may be combined in any adequate way in one or more embodiments.

The headings/references used herein are provided merely for convenience and hence do not define the extent of protection or the scope of the embodiments.

HDD is an acronym for Hard Disk Drive. Also, the designation voice coil motor or VCM may be used to designate linear motors that move the heads in hard disk drives.

A hard disk drive is a basic component of various types of processing devices, such as personal computers, servers, data centers, or the like, and is the physical location where information/data may be stored.

Control devices of HDDs may be configured with an integrated procedure to park the heads on a ramp outside the disks. This procedure may be referred to as ramp loading and may be controlled via software and/or may be activated automatically in the event of a power failure, for example.

For example, a controller of the HDD may be configured to perform, in the event of a power failure, a procedure involving rectification of the back electromotive force (BEMF) of the spindle motor that is used to energize the VCM motor and the control circuitry of the VCM motor to carry out the procedure for parking the heads on the ramp.

Figure 1:
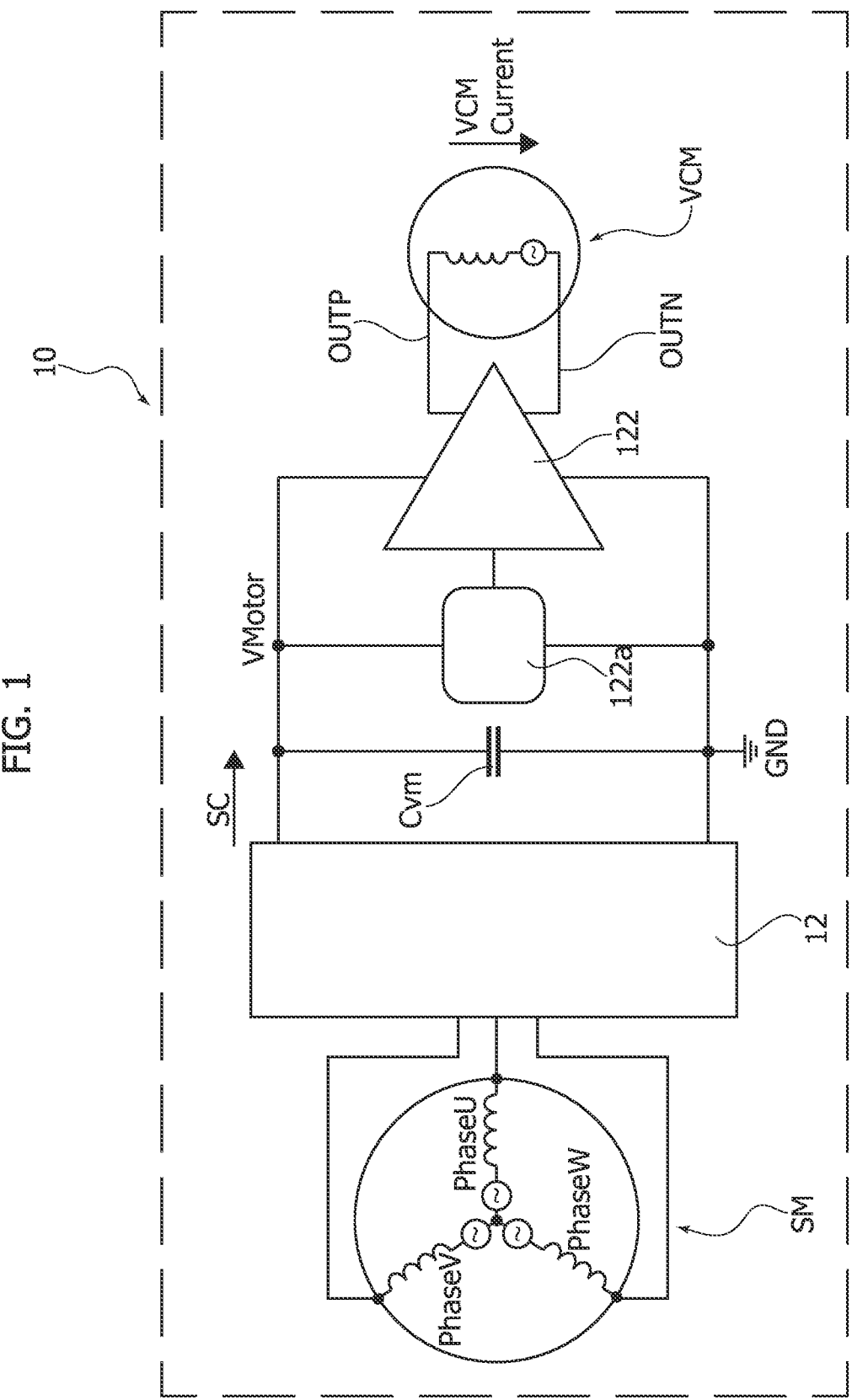
FIG. 1 is a block diagram of a system of an embodiment that rectifies the back electromotive force (BEMF) of a spindle motor in a hard disk drive (HDD) to maintain the voltage Vmotor to a suitable level so as to facilitate a preferred supply to the VCM parking procedure at power off.

FIG. 1 is a block diagram of a system embodiment (in a hard disk drive 10) that rectifies the back electromotive force (BEMF) of a spindle motor SM to feed the power stage that drives the VCM motor during the parking procedure, for example in an event of a power failure.

The system embodiment of FIG. 1 is configured such that in response to a power off, a head retract procedure is energized via rectification of the BEMF of the spindle motor SM. To that effect, the voltages across the windings ("phases", PhaseU, PhaseV, PhaseW) of the spindle motor SM are supplied to a regulator 12. Based thereon, the regulator 12 (this may include for that purpose, e.g., a synchronous step-up regulator module operating at 40 kHz with 60% duty-cycle) may produce a (rectified) spindle current SC. This current may be used to charge a capacitor Cvm coupled between a line Vmotor and a reference node such as ground GND.

The energy stored on the capacitor Cvm may thus be used to implement, via a VCM power stage 122, controlled via a module 122A (operating, e.g., at 1 kHz with 60% duty-cycle), a retract procedure for the VCM.

The system embodiment of FIG. 1 is configured such that at power off, the BEMF of the spindle motor SM may be rectified so as to maintain the voltage at the node/line Vmotor to a level adequate to facilitate head retract.

The ramp loading procedure may be carried out in two ways, for example: at constant voltage or at constant speed.

Figure 2:
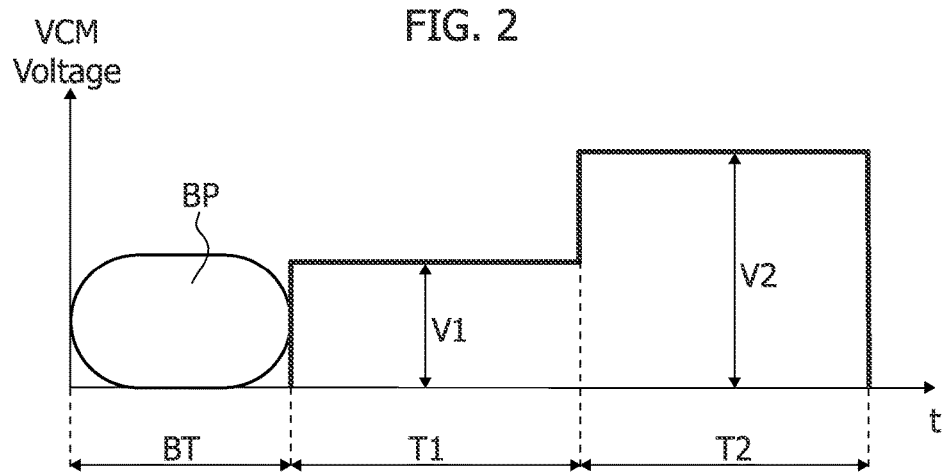
FIG. 2 is a time diagram exemplary of a head parking procedure embodiment in an HDD carried out at constant voltage.

As exemplified in FIG. 2, constant voltage control may involve applying two different voltage levels, V1 and V2, to the VCM (VCM Voltage), each of which is associated with a respective time interval, T1 and T2.

Both the voltage levels V1 and V2, and the duration of the times T1 and T2, may be programmable, that is, may be set in view of a certain application.

For example, the polarity of the voltage applied to the VCM motor may be determined in such a way as to generate a current that drives the motor in the direction for head movement towards the parking ramp.

The voltage V1 may be applied by the output stage and may drive the VCM from the disk to the parking area at the end of a ramp. The voltage V2, which generally may be higher than V1, may be a bias voltage intended to keep the VCM well anchored to a parking position at the end of a parking phase, reducing/avoiding undesired bouncing back of the heads, for example.

As also shown in FIG. 2, the constant voltage parking procedure may also be preceded by a brake phase BP over a braking time BT in an event that the VCM is moving the heads at a high speed at the time the parking procedure is started, for example.

Constant speed control of the VCM during ramp loading may be carried out through the direct reading of the BEMF generated by the spindle motor SM.

Figure 3:
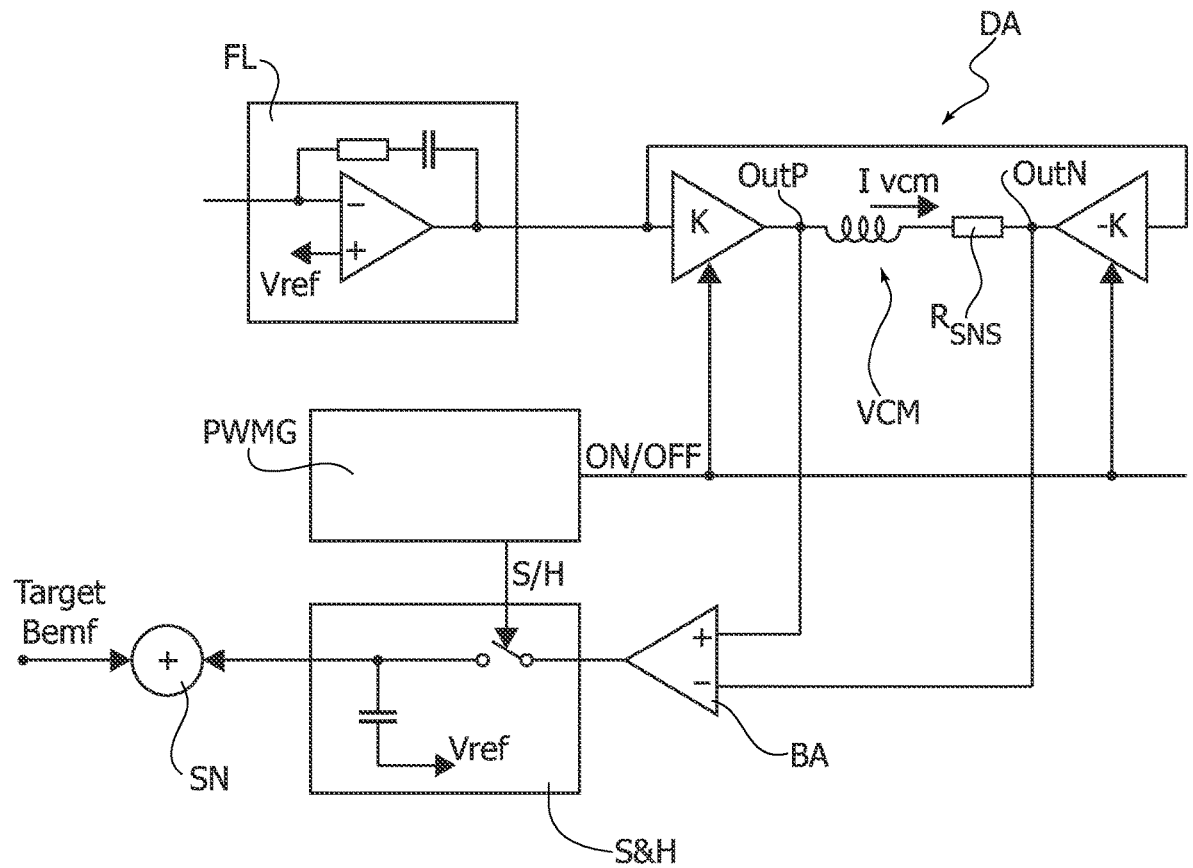
FIG. 3 is a block diagram of a circuitry embodiment configured to carry out parking of the heads in an HDD at constant speed, with a VCM motor driven in a discontinuous mode.

As exemplified in a circuit embodiment shown in FIG. 3, constant speed control of the VCM may be implemented via a differential amplifier arrangement DA (with complementary gains +K and −K) connected to the two outputs OutP and OutN when the output stage is in a high impedance condition (e.g., tristate) and there is little or no current Ivcm flowing in the VCM (this may be detected via a current sensing resistor $R_{SNS}$).

The differential amplifier arrangement DA of FIG. 3 may be implemented in an embodiment of FIG. 1 at block 122, for example.

In case the exemplary block diagram of FIG. 3 is used to implement a constant speed parking procedure in an embodiment, a target BEMF (labeled Target Bemf in FIG. 3) may be applied to a summing node SN that drives (e.g., via a filter FL) the differential amplifier arrangement DA, for example.

The voltage across the two outputs OutP and OutN of the differential amplifier arrangement DA may be brought to the "+" and "−" inputs of a BEMF amplifier BA whose output may be applied, via a sample and hold circuit S&H, to the summing node SN.

A pulse-width-modulation discontinuous generator PWMG may apply a pulse-width-modulated signal ON/OFF to the gain stages +K and −K of the differential amplifier arrangement DA and may control correspondingly the sample and hold circuit S&H via a signal S/H.

Figure 4:
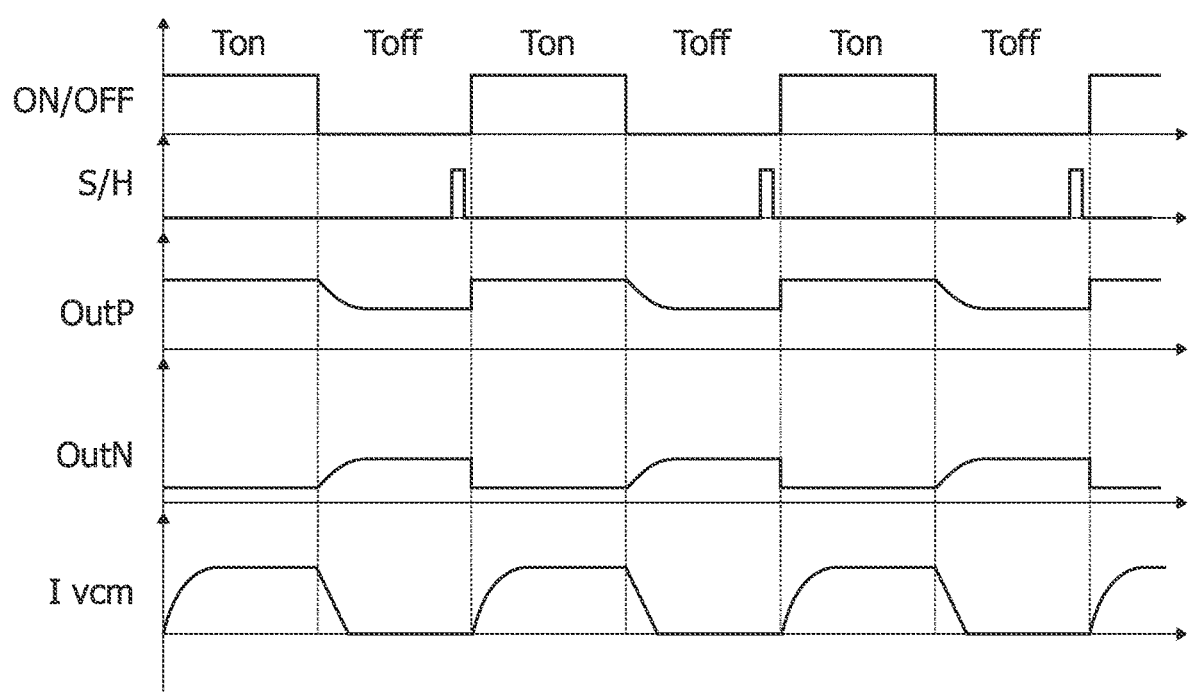
FIG. 4 is a time diagram for an embodiment, representative of an example time behavior of voltages and currents involved in a parking phase at constant speed.

FIG. 4 is a time diagram of example time behaviors of the voltages and currents involved in a parking phase at constant speed for an example embodiment.

Specifically, the time diagram of FIG. 4 is exemplary of time behaviors of the following signals (from top to bottom):
the ON/OFF signal from the pulse-width-modulation generator PWMG,
the S/H signal from the pulse-width-modulation generator PWMG,
the voltage at node OutP,
the voltage at node OutN, and
the current Ivcm through the VCM,
during a parking phase at constant speed.

A bias phase may be applied also in a constant speed parking procedure after the heads are brought to the parking position at an end of a ramp, by applying a voltage V2 for a time T2.

As discussed, the motor head parking system may be powered by rectifying the BEMF of the spindle motor SM, for example when the power supply to the hard disk drive fails.

Rectification of the spindle motor BEMF may be carried out in various ways. Synchronous rectification and spindle step up may be used for that purpose, for example.

In both cases, rectification of the spindle motor BEMF may result in a DC voltage having superimposed a voltage ripple that is a function of the number of phases of the spindle motor.

If the spindle motor is a three-phase motor, for example (a common option), the result of BEMF rectification may be a DC voltage with a superimposed voltage ripple with a frequency equal to six times the electric revolution of the spindle, for example.

By way of example, FIGS. 5A and 5B (where FIG. 5B is a zoomed reproduction of the portion II of the curves of the diagram of FIG. 5A) show an example time behavior of the waveform of voltage Vmotor with the spindle motor SM at target speed (portion I of FIG. 5A) and BEMF synchronous rectification (portion II of FIG. 5A) activated following a power failure (Power Off) using an embodiment.

Signals corresponding to the phases of the spindle motor SM (PhA, PhB, and PhC) are also shown in FIGS. 5A and 5B.

The amplitude of the Vmotor voltage generated by rectifying the BEMF of the spindle motor SM, mainly depends on its electrical characteristics, such as: Rm (winding resistance), Lm (winding inductance), and Ke (winding factor).

The spindle motor SM may generate a BEMF that is proportional to its rotation speed. This however may represent a notional, no-load voltage.

When the head parking procedure is activated, the current that is supplied to the VCM motor may be provided by the spindle motor. Due to the resistance of the windings of the motor a voltage drop may occur in the spindle motor, which will be subtracted from the Vmotor voltage available in the absence of a load.

A less preferred case may be when the power stage that controls the VCM motor is completely saturated. Under these conditions, the rectified voltage of the spindle motor may be partitioned according to the relationship between the impedance of the spindle motor and the impedance of the VCM motor, for example.

Depending on this impedance ratio, the voltage Vmotor may thus drop to a (much) lower value than the value of Vmotor in a no-load condition.

Various example operating conditions for embodiments will be discussed in the following by referring both to constant voltage operation and to constant velocity (speed) operation.

FIGS. 6A and 6B, FIGS. 8A and 8B, and FIGS. 13A and 13B, refer to constant voltage operation with a constant voltage V1 applied during a (fixed and programmable) time T1.

FIGS. 7A and 7B, FIGS. 9A and 9B, and FIGS. 14A and 14B, refer to constant velocity (speed) operation over a time T1; in this case the time T1 is not per se fixed (and programmable), but depends on the programmed speed CV and the initial position of the VCM at Power Off.

The time T2 (hold phase) may involve constant voltage operation, even if constant velocity is implemented during the time T1.

In these examples, VCM Retract denotes the total duration T1+T2 of the VCM parking procedure.

In constant voltage operation, the time T1 may be a fixed and programmable time during which the VCM is driven with a constant voltage set to a value V1.

In constant velocity operation, the time T1 may be a time that depends on the duration of the movement (at a programmed speed CV) of the VCM during the head parking (retract) phase from a starting point on the disk surface to a final point at the end of the parking ramp.

In these examples (constant voltage and constant velocity), the time T2 may be devoted to a "hold" phase (performed at constant voltage V2 during a time T2, both may be programmable).

FIGS. 6A, 6B, 7A, and 7B are first examples of activation of a parking procedure of the heads of a hard disk drive following a lack of power supply (e.g., 12V) at a time labeled Power Off.

Here again, FIGS. 6B and 7B are a zoomed reproduction of the portion of the curves of the diagrams of FIG. 6A and FIG. 7A, respectively, illustrative of the time T2 during which a bias voltage V2 is applied to reduce/avoid undesired bouncing back of the HDD heads from the parking position.

In the diagrams of FIGS. 6A, 6B, 7A, and 7B, the following signals are shown (from top to bottom):
the voltage Vmotor,
the voltage across the VCM, namely (OutP-OutN), and
the VCM current.

In FIGS. 6A and 6B, V1/T1 and V2/T2 represent the voltages V1 and V2 being applied over intervals T1 and T2, respectively, as discussed previously, refer to a case of constant voltage parking, as discussed previously in connection with FIG. 2, for example.

FIGS. 7A and 7B refer to a case of parking at constant velocity or speed CV, as presented in FIGS. 3 and 4, for example.

In both cases, the parking procedure is followed by a constant voltage VCM bias phase where a voltage V2 is applied for a time T2, to facilitate safe positioning the heads in the parking area at an end of a park procedure.

These figures show that, during the bias phase of the VCM, the voltage applied to the VCM may be, e.g., 2V for a time of, e.g., 200 msec, while, due to current absorption by the spindle motor (and the consequent drop of internal voltage), during this bias phase the voltage Vmotor may settle at a DC value plus a voltage ripple for a minimum value of, e.g., 4V.

Under these example conditions, with the minimum value for Vmotor is equal to 4V and the voltage applied to the VCM motor is equal to 2V (in absolute value, but negative with respect to the terminals of the motor itself), the resulting current flowing in the VCM motor (in negative direction) will be a DC current proportional to the applied voltage and to the winding resistance of the same.

The quantitative values reported in the foregoing are merely exemplary and non-limiting; and in any case, it is noted that, when the voltage applied to the VCM is lower than the value of the voltage Vmotor, operation is as expected, with the programmed voltage (namely V2) correctly applied to the VCM motor.

In a case that the voltage V2 programmed in the VCM in the bias phase is higher and such as to draw more current from the spindle motor SM, an internal voltage drop will occur causing the voltage Vmotor to drop to lower values than the voltage V2, for example.

In that case, the output stage may enter saturation with the voltage Vmotor fully applied, which however will be lower than the programmed voltage V2.

FIGS. 8A, 8B, 9A, and 9B represent other examples of a parking procedure of the heads of an HDD following a lack of the power supply voltage, e.g., at 12V, with a bias voltage V2 programmed at, e.g., 4.5V.

Again, the quantitative values reported in the foregoing are merely exemplary and non-limiting. Here again, FIGS. 8B and 9B are a zoomed reproduction of the portion of the curves of the diagrams of FIG. 8A and FIG. 9A, respectively, illustrative of the time T2 during which a bias voltage V2 is applied in order to reduce/avoid undesired bouncing back of the HDD heads from the parking position.

In the diagrams of FIGS. 8A, 8B, 9A, and 9B, the following signals are again shown (from top to bottom):
- the voltage Vmotor,
- the voltage across the VCM, namely (OutP-OutN), and
- the VCM current.

FIGS. 8A and 8B, where V1/T1 and V2/T2 represent the voltages V1, V2 being applied over intervals T1, T2 as discussed previously, refer to a case of constant voltage parking, as discussed previously in connection with FIG. 2, for example.

Figure 9A:
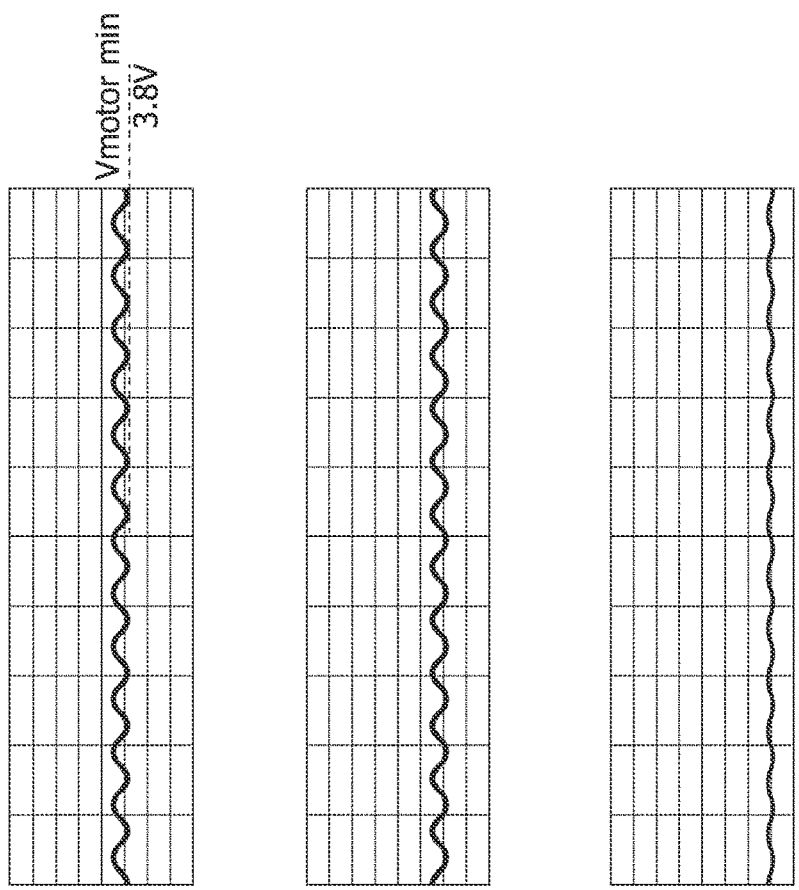
FIG. 9A is a time diagram of an embodiment, showing example time behaviors of various signals in response to activation of a constant velocity parking procedure, with a different programming of operating parameters with respect to FIGS. 7A and 7B.
Figure 9B:
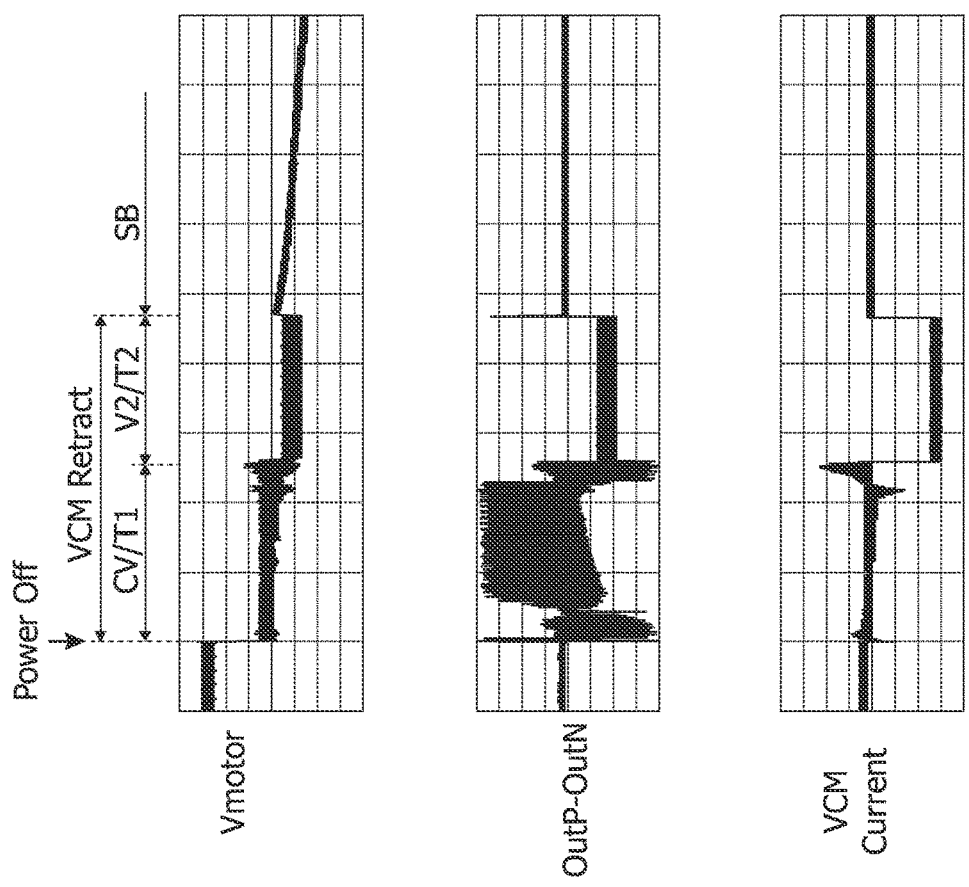
FIG. 9B is a zoomed reproduction of a portion of the curves of the diagram of FIG. 9A.

FIGS. 9A and 9B refer to a case of parking at constant velocity or speed, as presented in FIGS. 3 and 4, for example.

It is noted that, in these examples, due to the higher load represented by the current absorbed by the VCM motor during the bias phase, the voltage Vmotor is at a lower value than the programmed value for V2, which may again be assumed to be (by way of example) 4.5V. The power stage driving the VCM may thus enter saturation with the voltage Vmotor fully applied to the VCM.

The voltage ripple present on the voltage Vmotor may result in ripple affecting (also) the current flowing in the VCM. Such a current in the VCM motor (not a constant value DC current) may generate acoustic noise throughout the bias phase.

The acoustic noise generated will depend, e.g., on the amplitude of the current ripple, as well as the tone frequency and the electromechanical characteristics of the VCM.

The tone frequency may be the one deriving from the synchronous rectification of the BEMF of the spindle motor, namely six times the electrical rotation frequency of the spindle motor, for example.

As a (non-limiting) example, a 4-pole pair motor that rotates at 7200 rpm has an electrical rotation frequency of 480 Hz, so the frequency of the voltage ripple generated by synchronous rectification is 2880 Hz.

The current ripple generated at 2880 Hz (this is an approximate figure, because the spindle motor SM is actually slowing down during the parking phase) generates an acoustic noise tone that, depending on the mechanical resonances, may be annoying or, in any case, may induce an unpleasant feeling to the user.

The constant voltage parking procedure may be appreciated as a silent procedure, and countering generation of such noise is often desirable, for example in order to avoid performance perceived as degraded.

Even in a case of a constant speed procedure (where the VCM is driven in a discontinuous manner, thus being intrinsically noisy in acoustic terms) a bias phase affected by acoustic noise resulting from current ripple in the VCM throughout the duration T2 of the bias phase, is often undesirable as this may again result in performance perceived as degraded.

The power stage that controls a parking procedure of a VCM (both for constant voltage and for constant speed parking) may be more preferably driven in such a way that during the bias phase at the end of the park procedure, the VCM is driven with a voltage that is constant and free from voltage ripple.

This may be applied irrespective of the value of the programmed voltage V2 and of the voltage Vmotor during the parking phase.

Both the voltage level V2 and the time T2 over which the voltage V2 is applied may be programmable, within a range between a minimum value and a maximum value, and possibly with a customizable resolution of the programming steps.

As discussed so far, during the bias phase of the VCM, at the end of the parking procedure, a voltage V2 may be programmed for a time T2 regardless of the voltage value available for Vmotor, which derives from the rectification of the BEMF of the spindle motor SM in the absence of the supply voltage.

The voltage Vmotor may be known a priori (at no load) and depends on the characteristics of the motor (e.g., primarily Ke and the rotation speed).

When the spindle motor is under load (e.g., the VCM motor), due to the voltage drop in the spindle motor SM caused by current absorbed by the VCM, the value of the voltage Vmotor may drop to lower values than the nominal no-load value.

As repeatedly noted, undesired acoustic noise may be generated during the bias phase in response to the programmed voltage V2 being higher than the value of Vmotor during this phase.

When this condition is met, the power stage that controls the VCM enters full saturation and the voltage ripple present on the voltage Vmotor generates a current in the VCM that is also affected by ripple that leads to acoustic noise generated in this phase.

Solutions as presented herein involve controlling the voltage V2 applied during the bias phase at the end of the retract, with the capability of identifying if the voltage V2 destined to be applied to the VCM is higher than the value available on the Vmotor line.

In motor control devices for hard disks drives, the power stage that controls the VCM motor usually already includes circuitry configured to indicate the onset of saturation, namely that the power stage is entering (or is close to entering) saturation. This may apply both in the case of linear control and in the case of pulse-width-modulation, PWM control.

The case of linear control of the power stage may be considered for simplicity and ease of explanation, but the same discussion may apply to PWM control.

Figure 10:
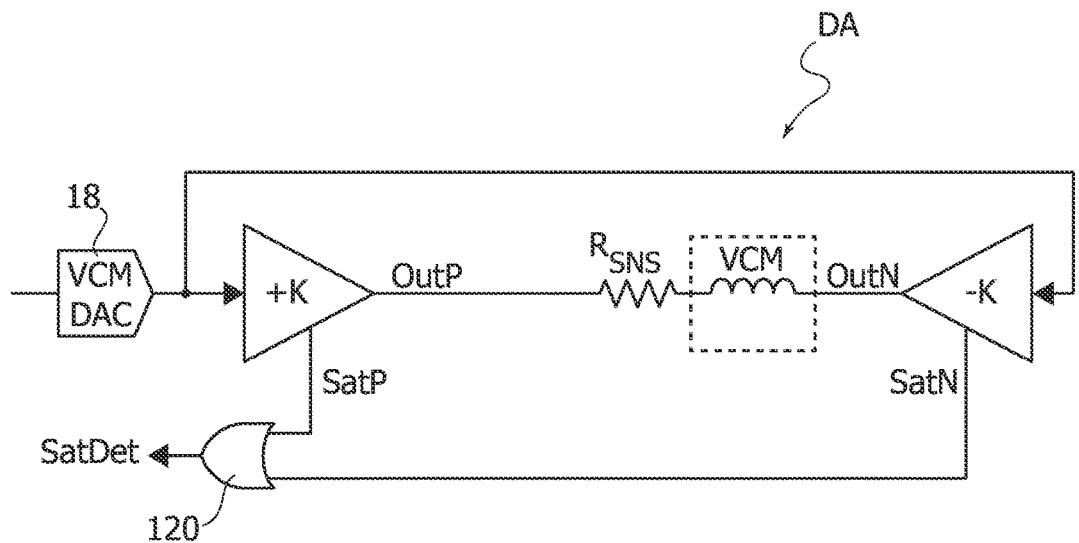
FIG. 10 is a block diagram for an embodiment of a power stage controlling a VCM motor including a saturation detection feature.

FIG. 10 is a block diagram of an embodiment having a power stage controlling a VCM motor including a saturation detection feature. This is essentially a power stage controlling a VCM (as illustrated in FIG. 3) where two signals SatP and SatN are obtained (in a manner known per se to those of skill in the art) from the +K and −K gain stages of the differential amplifier arrangement DA that controls the VCM motor. These signals may jointly provide information indicative of the output stage entering saturation, e.g., with a signal SatDet resulting from a logical sum (performed at an OR gate 120) of the signals SatP and SatN.

The information conveyed by the SatDet signal may facilitate understanding if the voltage Vmotor is lower than the bias voltage V2 that has been programmed, for example.

Figure 11:
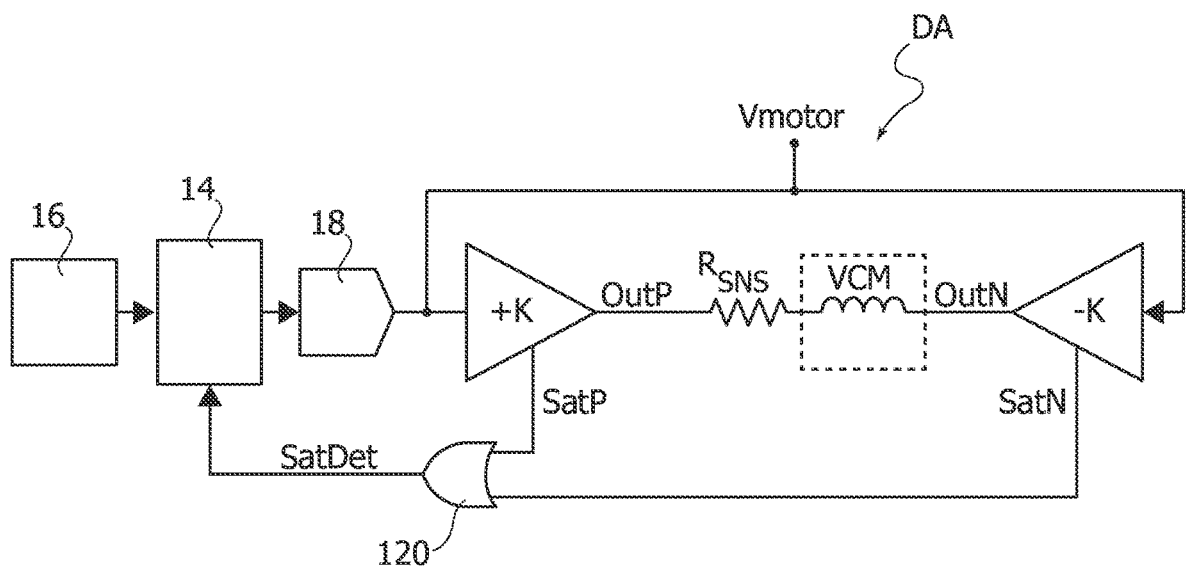
FIG. 11 is a block diagram of a voltage control system for a VCM motor in accordance with embodiments of the present description.

As depicted in FIG. 11, as an embodiment, a Vmotor versus V2 check block 14 may thus be provided (e.g., within the framework of architecture as presented in FIG. 3). The block 14 is sensitive to the programmed V2 voltage from a programming block 16 for the voltage V2 and to the signal SatDet.

In an event that, during the bias phase and depending on the programmed V2 and the Vmotor voltage level, a condition is detected by the block 14 indicative that the output stage is entering (or is close to entering) saturation, the block 14 will correct the value for the voltage V2 (e.g., via a programmable VCM digital-to-analog converter, DAC 18), in such a way as to decrease the voltage applied to the VCM during the bias phase.

That voltage may thus be kept constant, avoiding driving the VCM with a current affected by ripple that may be a source of acoustic noise generation.

Figure 12:
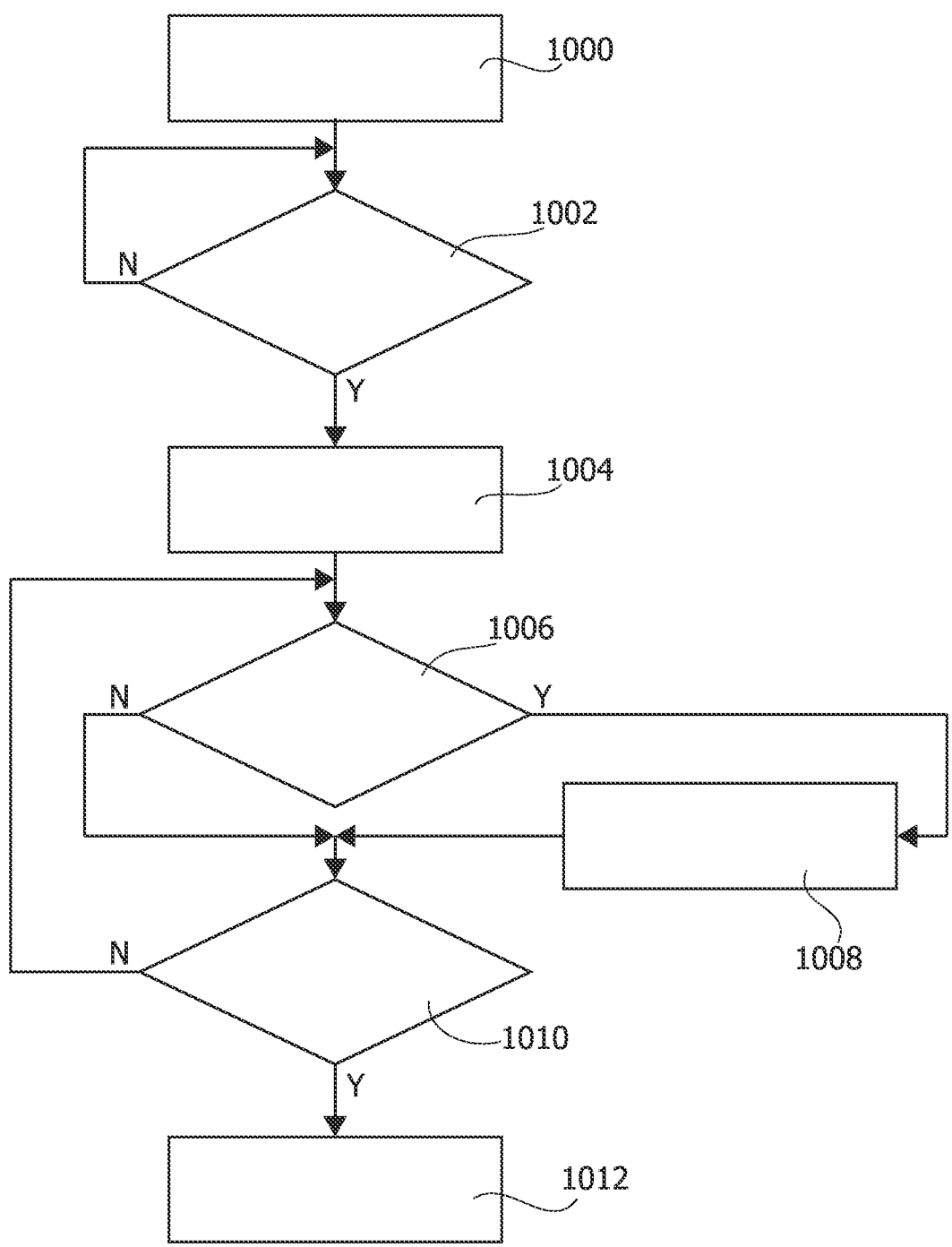
FIG. 12 is flow chart of a example implementation of embodiments of the present description.

FIG. 12 is flow chart of an example implementation of embodiments of the present description. Blocks 1000 to 1012 in FIG. 12 are an exemplary of the following:

Block 1000: emergency retract start;

Block 1002: check whether the retract movement of the HDD heads on the parking ramp (either at constant voltage or at constant speed, during a time T1) has ended; if outcome negative (N), loop back upstream of block 1002;

Block 1004: in response to outcome at block 1002 positive (Y), start bias phase applying voltage V2;

Block 1006: check whether VCM power stage is in saturation (e.g., based on signal SatDet);

Block 1008: decrease voltage V2 in response to positive outcome (Y) of check at block 1006;

Block 1010: check whether end of time T2 is either in response to outcome at block 1006 being negative (N), or following block 1008, if outcome of block low negative (N) loop back upstream of block 1006; and Block 1012: emergency retract procedure (VCM Retract) completed in response to outcome of block positive (Y).

Controlling the voltage V2 in response to detection of a condition where the power stage driving the VCM enters (or is close to enter) saturation may be of a different nature and with multiple application variants.

FIGS. 13A, 13B, 14A, and 14B, are again exemplary of activation of a parking procedure of the heads of a hard disk drive in an embodiment following, for example, a lack of the power supply (e.g., 12V) at a time labeled Power Off.

That is, FIGS. 13A, 13B, 14A, and 14B, are again exemplary of activation of a parking procedure of the heads of a hard disk drive in an embodiment having the rectifying (e.g., at the controller 12) of the back electromotive force (BEMF) of the spindle motor SM in a hard disk drive 10, and exploiting (e.g., SC, Cvm) the rectified BEMF of the spindle motor SM to energize at least one voice coil motor (VCM) in the hard disk drive 10 via a VCM power stage (e.g., 122 or DA) to retract the heads of the hard disk drive 10 to a park position.

As discussed herein, the retract procedure of an embodiment may include a first retract phase and a second retract phase. In the first retract phase (for example V1/T1 in FIGS. 13A and 13B—constant voltage—or CV/T1 in FIGS. 14A and 14B—constant velocity; see also 1000 in FIG. 12), the heads of the hard disk drive 10 are moved towards a park position. And in the second retract phase (for example V2/T2, both in FIGS. 13A and 13B—constant voltage—and in FIGS. 14A and 14B—constant velocity; see also 1004 in FIG. 12) a bias voltage V2 is applied to the VCM power stage DA during a bias interval T2 to retain the heads of the hard disk drive (10) in the park position.

Figure 14A:
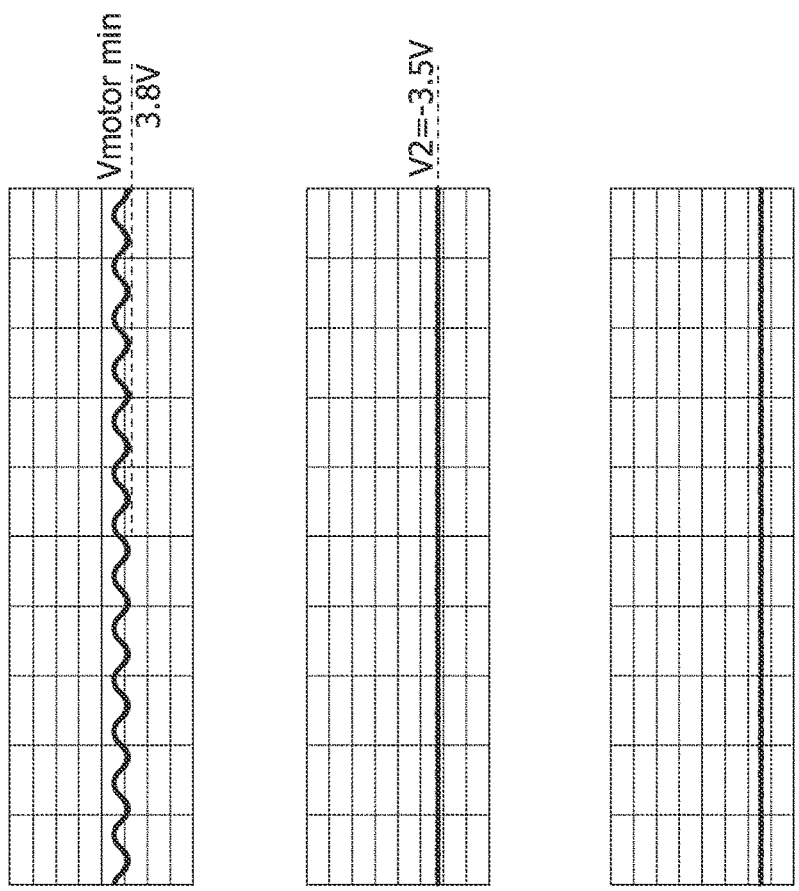
FIG. 14A is a time diagram showing example time behaviors of various signals in constant velocity embodiments of the present description.
Figure 14B:
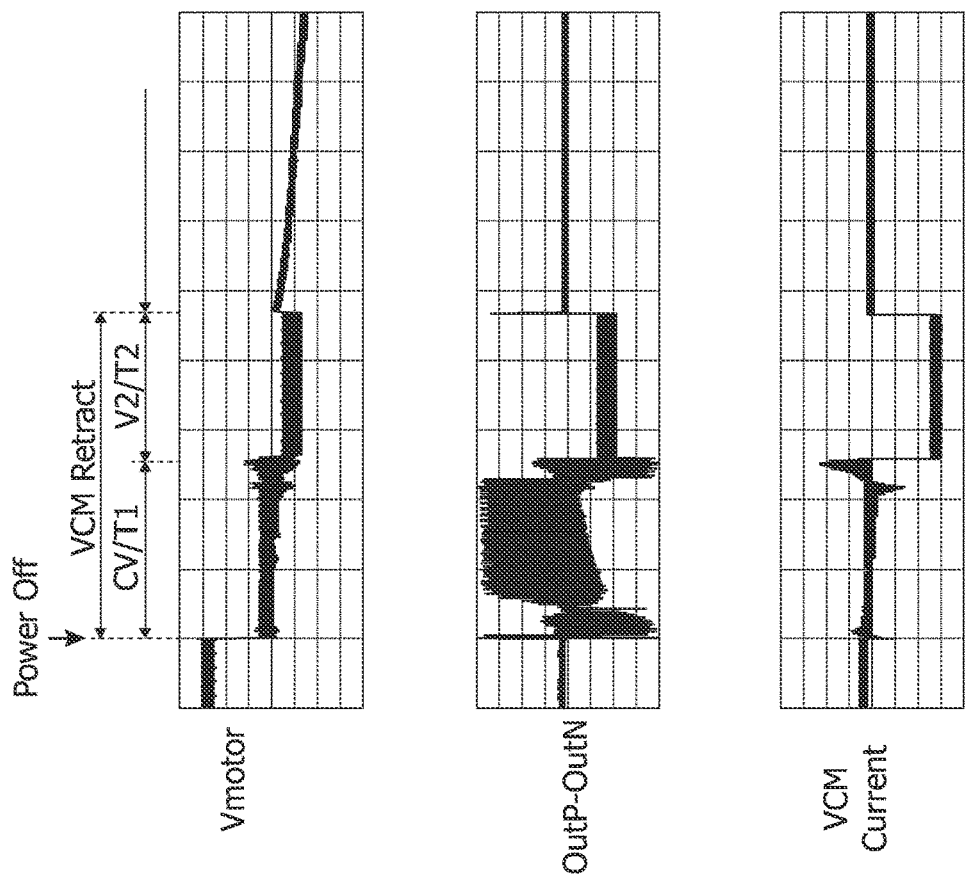
FIG. 14B is a zoomed reproduction of a portion of the curves of the diagram of FIG. 14A.

Here again, FIGS. 13B and 14B are a zoomed reproduction of the portion of the curves of the diagrams of FIG. 13A and FIG. 14A, respectively, illustrative of the time T2 during which a bias voltage V2 is applied to reduce/avoid undesired bouncing back of the HDD heads from the parking position.

Again, in the diagrams of FIGS. 13A, 13B, 14A, and 14B the following signals are shown (from top to bottom):

the voltage Vmotor, the voltage across the VCM, namely (OutP-OutN), and the VCM current.

In FIGS. 13A and 13B, V1/T1 and V2/T2 represent the voltages V1 and V2 being applied over intervals T1 and T2, respectively, and refer to an example case of constant voltage parking, as discussed previously in connection with FIG. 2, for example.

FIGS. 14A and 14B refer to an example case of parking at constant velocity or speed CV, as presented in FIGS. 3 and 4, for example.

More specifically, FIGS. 13A and 13B are exemplary (for an embodiment) of activation of a parking procedure of the heads of a hard disk following a lack of the supply voltage (e.g., at 12V) with a voltage V1 set at 0.5V and a bias voltage V2 programmed at 4.5V, for example.

FIGS. 14A and 14B are exemplary (for an embodiment) of activation of a parking procedure of the heads of a hard disk following a lack of the supply voltage (e.g., at 12V) with head velocity set at CV=10 ips and a bias voltage V2 programmed at 4.5V, for example.

Once more, the quantitative values reported in the foregoing are merely exemplary and non-limiting.

In both cases, despite the voltage V2 being (notionally) programmed at, e.g., 4.5V, the real voltage applied to the VCM motor may be automatically adjusted to, e.g., 3.5V, that is to a level (slightly) lower than the minimum level of the voltage Vmotor during VCM retract (e.g., 3.8V) so as to avoid bringing the power stage that controls the VCM motor in full saturation.

In that way, the VCM may be supplied with a DC voltage exempt from ripple thus obtaining a current circulating in the VCM motor that has a substantially constant value and may be free from undulations that may generate acoustic noise.

To summarize, FIGS. 11, 12, 13A, 13B, 14A, and 14B are illustrative of producing a saturation signal SatDet indicative of onset of saturation in the VCM power stage DA, that is of the VCM power stage entering or being close to entering saturation, and controlling the bias voltage V2 during the second retract phase (e.g., V2/T2) based on the saturation signal SatDet in order to counter saturation in the VCM power stage.

As exemplified, a value may be set (e.g., programmed at block 16) for the bias voltage V2, and that value may be reduced (see block 1008 in FIG. 12) in response to the saturation signal SatDet indicating onset of saturation in the VCM power stage DA.

With the rectified BEMF of the spindle motor SM having a rectified value Vmotor, a check may be made whether the rectified value Vmotor is higher or lower than the value set for the bias voltage V2, and the value set for the bias voltage V2 may be adjusted based on (perhaps only based on) the rectified value Vmotor, if the rectified voltage Vmotor is found to be lower than the bias voltage V2.

The output stage typically may enter saturation when it attempts to regulate a voltage that is higher than the level Vmotor.

For instance, if Vmotor=4V and the desired regulation is 3.5V, operation is as expected (with the signal SatDet in FIG. 11 equal to 0).

Conversely (and still for example), if Vmotor=4V and the desired regulation is 4.5V, the output stage enters saturation (with the signal SatDet in FIG. 11 equal to 1) and the level of the voltage regulated is reduced to exit saturation.

Once again, the quantitative values reported in the foregoing are non-limiting; they are mentioned merely by way of exemplary explanation.

Without prejudice to the underlying principles, the details and embodiments may vary, even significantly, with respect to what has been described in the foregoing, by way of example only, without departing from the extent of protection determined by the claims.

The invention claimed is:

1. A method, comprising:
rectifying a back electromotive force of a spindle motor in a hard disk drive;
energizing a voice coil motor in the hard disk drive using the rectified back electromotive force of the spindle motor via a voice coil motor power stage to retract a head of the hard disk drive to a park position, wherein the head is retracted by moving the head towards the park position during a first retract phase, and retaining the head in the park position during a second retract phase by applying a bias voltage to the voice coil motor power stage during a bias interval of the second retract phase;
producing a saturation signal indicative of onset of saturation in the voice coil motor power stage; and
controlling the bias voltage during the second retract phase based on the saturation signal to counter saturation in the voice coil motor power stage.

2. The method of claim 1, further comprising:
setting a value for the bias voltage; and
reducing the value set for the bias voltage in response to the saturation signal indicating onset of saturation in the voice coil motor power stage.

3. The method of claim 2, wherein the rectified back electromotive force of the spindle motor has a rectified voltage value, the method further comprises:
checking whether the rectified voltage value is lower than the value set for the bias voltage; and
adjusting the value set for the bias voltage based on the rectified voltage value in response to the rectified voltage value being lower than said bias voltage.

4. The method of claim 3, wherein the first retract phase further comprises applying a constant voltage to the voice coil motor power stage to move the head of the hard disk drive towards the park position.

5. The method of claim 3, wherein the first retract phase further comprises moving the head of the hard disk drive towards the park position with a constant velocity.

6. The method of claim 1, wherein the first retract phase further comprises applying a constant voltage to the voice coil motor power stage to move the head of the hard disk drive towards the park position.

7. The method of claim 1, wherein the first retract phase further comprises moving the head of the hard disk drive towards the park position with a constant velocity.

8. A control circuit for a voice coil motor in a hard disk drive having a spindle motor, wherein the control circuit is configured to:
rectify a back electromotive force of the spindle motor in the hard disk drive;
energize a voice coil motor in the hard disk drive using the rectified back electromotive force of the spindle motor via a voice coil motor power stage to retract a head of the hard disk drive to a park position, wherein the head is retracted by moving the head towards the park position during a first retract phase and retaining the head in the park position during a second retract phase by applying a bias voltage to the voice coil motor power stage during a bias interval of the second retract phase;
produce a saturation signal indicative of onset of saturation in the voice coil motor power stage; and
control the bias voltage during the second retract phase based on the saturation signal to counter saturation in the voice coil motor power stage.

9. The control circuit of claim 8, further comprising a bias setting node configured to receive a set value for the bias voltage, and the control circuit being configured to reduce the value set for the bias voltage in response to the saturation signal indicating onset of saturation in the voice coil motor power stage.

10. The control circuit of claim 9, wherein the control circuit is configured to:
rectify the back electromotive force of the spindle motor to a rectified value,
check if the rectified value is lower than the value set for the bias voltage, and
adjust the value set for the bias voltage based on the rectified value in response to a rectified voltage being found to be lower than the bias voltage.

11. The control circuit of claim 8, wherein the first retract phase further comprises applying a constant voltage to the voice coil motor power stage to move the head of the hard disk drive towards the park position.

12. The control circuit of claim 8, wherein the first retract phase further comprises moving the head of the hard disk drive towards the park position with a constant velocity.

13. A control circuit for a voice coil motor in a hard disk drive having a spindle motor, the control circuit comprising:
a regulator coupled to windings of the spindle motor, the regulator being configured to rectify a spindle current of a back electromotive force of the spindle motor;
a capacitor coupled between an output of the regulator and a reference node; and
a voice coil motor power stage coupled between the output of the regulator and the reference node, the voice coil motor power stage being configured to drive the voice coil motor using the rectified spindle motor current to retract a head of the hard disk drive to a park position;
wherein the retracting of the head comprises moving the head towards the park position during a first retract phase, and retaining the head in the park position during a second retract phase by applying a bias voltage to the voice coil motor power stage during a bias interval of the second retract phase;
wherein the voice coil motor power stage is configured to produce a saturation signal indicative of onset of saturation in the voice coil motor power stage; and
wherein the voice coil motor power stage is configured to control the bias voltage during the second retract phase based on the saturation signal to counter saturation in the voice coil motor power stage.

14. The control circuit of claim 13, wherein the voice coil motor power stage comprises:
a back electromotive force amplifier;
a differential amplifier arrangement configured to provide two outputs of the differential amplifier arrangement to inputs of the back electromotive force amplifier;
a pulse-width-modulation generator coupled to the differential amplifier arrangement such that the pulse-width-modulation generator is configured to apply a pulse-width-modulation signal to gain stages of the differential amplifier arrangement; and
a sample and hold circuit coupled to the differential amplifier arrangement and the pulse-width-modulation generator, such that the pulse-width-modulation generator is configured to control the sample and hold circuit, and such that an output of the back electromotive force amplifier is configured to apply the bias voltage to a summing node via the sample and hold circuit in response to the control of the sample and hold circuit by the pulse-width-modulation generator.

15. The control circuit of claim 13, further comprising a bias setting node configured to receive a set value for the bias voltage, and the control circuit being configured to reduce the value set for the bias voltage in response to the saturation signal indicating onset of saturation in the voice coil motor power stage.

16. The control circuit of claim 13, wherein the control circuit is configured to:
rectify the back electromotive force of the spindle motor to a rectified value,
check if the rectified value is lower than the value set for the bias voltage, and
adjust the value set for the bias voltage based on the rectified value in response to the rectified voltage being found to be lower than the bias voltage.

17. The control circuit of claim 16, wherein the first retract phase further comprises applying a constant voltage to the voice coil motor power stage to move the head of the hard disk drive towards the park position.

18. The control circuit of claim 16, wherein the first retract phase further comprises moving the head of the hard disk drive towards the park position with a constant velocity.

19. The control circuit of claim 13, wherein the first retract phase further comprises applying a constant voltage to the voice coil motor power stage to move the head of the hard disk drive towards the park position.

20. The control circuit of claim 13, wherein the first retract phase further comprises moving the head of the hard disk drive towards the park position with a constant velocity.

* * * * *